(12) United States Patent
Wong et al.

(10) Patent No.: US 10,976,502 B2
(45) Date of Patent: Apr. 13, 2021

(54) OUTDOOR RATED ASSEMBLY CONFIGURED TO BLIND MATE OPPOSING FIBER OPTIC CONNECTORS THEREIN WITH A SAFETY SPRING ASSEMBLY

(71) Applicant: Senko Advanced Components Inc, Marlborough, MA (US)

(72) Inventors: Yim Wong, Kowloon (HK); Kenji Iizumi, Tokyo (JP); Jin Jian Feng, Shanghai (CN)

(73) Assignee: Seniko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/600,433

(22) Filed: Oct. 11, 2019

(65) Prior Publication Data
US 2020/0116950 A1    Apr. 16, 2020

Related U.S. Application Data

(60) Provisional application No. 62/744,612, filed on Oct. 11, 2018.

(51) Int. Cl.
*G02B 6/38* (2006.01)
(52) U.S. Cl.
CPC .......... *G02B 6/3849* (2013.01); *G02B 6/389* (2013.01); *G02B 6/3869* (2013.01); *G02B 6/3821* (2013.01)
(58) Field of Classification Search
CPC .. G02B 6/3816; G02B 6/3821; G02B 6/3825; G02B 6/3849; G02B 6/3869; G02B 6/3885; G02B 6/389; G02B 6/3893
See application file for complete search history.

(56) References Cited

U.S. PATENT DOCUMENTS

| | | | |
|---|---|---|---|
| 6,116,790 A | 9/2000 | Vergeest |
| 6,227,895 B1 | 5/2001 | McFarlane |
| 6,542,674 B1 | 4/2003 | Gimblet |
| 6,546,175 B1 | 4/2003 | Wagman |
| 6,585,423 B1 | 7/2003 | Vergeest |
| 6,648,520 B2 | 11/2003 | McDonald |
| 6,714,710 B2 | 3/2004 | Gimblet |

(Continued)

FOREIGN PATENT DOCUMENTS

| | | | |
|---|---|---|---|
| CH | 682184 A5 * | 7/1993 | ........... G02B 6/3821 |
| JP | 5749877 B1 | 7/2017 | |

(Continued)

OTHER PUBLICATIONS

International Search Report and Written Opinion, Application No. PCT/US2019/056006, dated Dec. 18, 2019.

*Primary Examiner* — Daniel Petkovsek
(74) *Attorney, Agent, or Firm* — Edward S. Jarmolowicz, Esq.

(57) ABSTRACT

An outdoor rated assembly is configured to blind mate opposing fiber optic connectors. An outdoor rated adapter has a first non-outdoor rated fiber optic connector and an outdoor rated connector has a second non-outdoor rated fiber optic connector. The opposing connector and adapter are mated to form an outdoor rated assembly to protect the two internal fiber optic connectors from moisture and debris. The outdoor rated assembly has a safety spring assembly to prevent the outdoor connector components from separating and to support a push/pull attachment and release of the outdoor connector from the outdoor adapter.

6 Claims, 11 Drawing Sheets

(56) References Cited

U.S. PATENT DOCUMENTS

| | | |
|---|---|---|
| 6,785,450 B2 | 8/2004 | Wagman |
| 6,899,467 B2 | 5/2005 | McDonald |
| 7,001,079 B2 | 2/2006 | Vergeest |
| 7,090,406 B2 | 8/2006 | Melton |
| 7,090,407 B2 | 8/2006 | Melton |
| 7,111,990 B2 | 9/2006 | Melton |
| 7,113,679 B2 | 9/2006 | Melton |
| 7,234,875 B2 | 6/2007 | Krowiak |
| 7,241,056 B1 | 7/2007 | Kuffel |
| 7,264,402 B2 | 9/2007 | Theuerkorn |
| 7,281,856 B2 | 10/2007 | Grzegorzewska |
| 7,344,317 B2 | 3/2008 | Krowiak |
| 7,429,136 B2 | 9/2008 | Lewallen |
| 7,431,513 B2 * | 10/2008 | Sezerman ............ G02B 6/3821 |
| | | 385/53 |
| 7,467,896 B2 | 12/2008 | Melton |
| 7,572,065 B2 | 8/2009 | Lu |
| 7,654,747 B2 | 2/2010 | Theuerkorn |
| 7,654,748 B2 | 2/2010 | Kuffel |
| 7,744,286 B2 | 6/2010 | Lu |
| 7,744,288 B2 | 6/2010 | Lu |
| 7,762,726 B2 | 7/2010 | Lu |
| 7,785,015 B2 | 8/2010 | Melton |
| 7,785,019 B2 | 8/2010 | Lewallen |
| 7,824,109 B2 * | 11/2010 | Tanaka ................ G02B 6/3849 |
| | | 385/60 |
| 7,881,576 B2 | 2/2011 | Melton |
| 7,891,882 B2 | 2/2011 | Kuffel |
| 7,918,609 B2 | 4/2011 | Melton |
| 7,942,590 B2 | 5/2011 | Lu |
| 7,959,361 B2 | 6/2011 | Lu |
| 8,052,333 B2 | 11/2011 | Kuffel |
| 8,202,008 B2 | 6/2012 | Lu |
| 8,231,282 B2 | 7/2012 | Kuffel |
| 8,297,850 B2 | 10/2012 | Nishioka |
| 8,348,519 B2 | 1/2013 | Kuffel |
| 8,393,803 B2 * | 3/2013 | Hogue .................... G02B 6/36 |
| | | 385/78 |
| 8,414,196 B2 | 4/2013 | Lu |
| 8,496,384 B2 | 7/2013 | Kuffel |
| 8,506,173 B2 | 8/2013 | Lewallen |
| 8,573,859 B2 | 11/2013 | Larson |
| 8,672,560 B2 | 3/2014 | Haley |
| 8,699,467 B2 | 4/2014 | Lindoff |
| 8,714,835 B2 | 5/2014 | Kuffel |
| 8,770,862 B2 | 7/2014 | Lu |
| 8,840,320 B2 | 9/2014 | Park |
| 8,939,654 B2 | 1/2015 | Lu |
| 9,103,995 B2 | 8/2015 | Park |
| 9,239,441 B2 | 1/2016 | Melton |
| 9,291,780 B2 | 3/2016 | Lu |
| 9,304,262 B2 | 4/2016 | Lu |
| 9,310,570 B2 | 4/2016 | Busse |
| 9,397,441 B2 | 7/2016 | Sun |
| 9,442,257 B2 | 9/2016 | Lu |
| 9,482,829 B2 | 11/2016 | Lu |
| 9,519,114 B2 | 12/2016 | Zimmel |
| 9,535,230 B2 | 1/2017 | Newbury |
| 9,664,862 B2 | 5/2017 | Lu |
| 9,684,138 B2 | 6/2017 | Lu |
| 9,733,436 B2 * | 8/2017 | Van Baelen ......... G02B 6/3887 |
| 9,739,951 B2 | 8/2017 | Busse |
| 9,854,151 B2 | 12/2017 | Endo |
| 9,964,715 B2 | 5/2018 | Lu |
| 9,983,366 B2 | 5/2018 | Bund |
| 10,012,802 B2 | 7/2018 | Newbury |
| 10,101,538 B2 | 10/2018 | Lu |
| 10,114,176 B2 | 10/2018 | Gimblet |
| 10,146,015 B2 | 12/2018 | Zimmel |
| 10,162,126 B2 | 12/2018 | Elenbaas |
| 10,180,541 B2 | 1/2019 | Coenegracht |
| 10,197,739 B2 | 2/2019 | Ohtsuka |
| 10,234,641 B2 | 3/2019 | Hill |
| 10,317,628 B2 | 6/2019 | Van Baelen |
| 10,338,323 B2 | 7/2019 | Lu |
| 10,401,578 B2 | 9/2019 | Coenegracht |
| 10,451,811 B2 | 10/2019 | Coenegracht |
| 10,473,866 B2 | 11/2019 | Newbury |
| 10,502,907 B2 | 12/2019 | Wang |
| 2006/0045428 A1 | 3/2006 | Theuerkorn |
| 2007/0020973 A1 | 1/2007 | Sattele et al. |
| 2008/0273855 A1 | 11/2008 | Bradley |
| 2009/0257717 A1 | 10/2009 | Liu |
| 2010/0329267 A1 | 12/2010 | Sakamoto |
| 2011/0222826 A1 | 9/2011 | Blackburn |
| 2013/0136398 A1 | 5/2013 | Isenhour |
| 2015/0043870 A1 | 2/2015 | Busse et al. |
| 2015/0260924 A1 | 9/2015 | Huang et al. |
| 2016/0131857 A1 * | 5/2016 | Pimentel ............. G02B 6/3893 |
| | | 385/78 |
| 2017/0212316 A1 | 7/2017 | Takano et al. |
| 2017/0227719 A1 | 8/2017 | Zimmel |
| 2017/0307831 A1 | 10/2017 | Katagiyama et al. |
| 2018/0224610 A1 | 8/2018 | Pimentel |
| 2018/0231720 A1 | 8/2018 | Lu |
| 2019/0107667 A1 | 4/2019 | Huang |
| 2019/0107677 A1 | 4/2019 | Coenegracht |
| 2019/0146161 A1 | 5/2019 | Elenbaas |
| 2019/0179088 A1 | 6/2019 | Zimmel |
| 2019/0235177 A1 | 8/2019 | Lu |
| 2019/0302389 A1 | 10/2019 | Newbury |
| 2019/0324217 A1 | 10/2019 | Lu |
| 2019/0369336 A1 | 12/2019 | Van Baelen |
| 2020/0003965 A1 | 1/2020 | Coenegracht |
| 2020/0012050 A1 * | 1/2020 | Takano .................. G02B 6/406 |
| 2020/0012051 A1 | 1/2020 | Coenegracht |
| 2020/0166711 A1 * | 5/2020 | Hu ........................... F16F 1/06 |

FOREIGN PATENT DOCUMENTS

| | | |
|---|---|---|
| WO | WO2010039830 A2 | 4/2010 |
| WO | WO2010039830 A3 | 6/2010 |
| WO | 2016063377 A1 | 6/2014 |
| WO | WO2016073273 A2 | 5/2016 |
| WO | WO2016073273 A3 | 6/2016 |
| WO | WO2018157115 A1 | 8/2018 |
| WO | WO2019173350 A1 | 9/2019 |

* cited by examiner

OUTDOOR RATED ASSEMBLY CONFIGURED TO BLIND MATE OPPOSING FIBER OPTIC CONNECTORS THEREIN WITH A SAFETY SPRING ASSEMBLY

CROSS REFERENCE TO RELATED APPLICATIONS

The present application claims priority to U.S. Pat. Application 62/744,612 filed on Oct. 11, 2018, titled "Fiber Optic Roll In Connector with Safety Spring", which is fully incorporated herein by reference.

FIELD OF THE INVENTION

The present disclosure relates generally to fiber optic connectors and systems, and specifically to optical fiber connectors used in outdoor applications requiring ingress protection against environmental conditions.

BACKGROUND

The prevalence of the Internet has led to unprecedented growth in communication networks. Consumer demand for service and increased competition has caused network providers to continuously find ways to improve quality of service while reducing cost.

Certain solutions have included deployment of outdoor rated connectors and adapters, called an assembly in the present invention, that each contain and protect non-outdoor rated fiber optic connectors. These outdoor rated devices undergo frequent reconfiguration as network density within a city changes. There is a need for an outdoor rated connector and outdoor rated adapter that can mate two non-outdoor rated opposing fiber optic connectors, where the mating is a blind mate. A blind mate occurs when two opposing fiber optic connectors, one male and one female are mated within an enclosure, such as the outdoor connector and outdoor adapter. The user cannot see the actual mating, so at an endface of the opposing connectors, the ferrules may be twisted, debris may be caught or housings may jam, and the user can only determine an improper connection by perform a signal test on the optical path. This is not desired because the user has to break open the communication path on either side of the mated fiber optic connectors resulting in further network disruption, additional expenditure of manpower and possible other damage that may go undetected.

So to improve the reliability of communication infrastructure, which depends on secure connections between components, such as cable segments, network equipment, and communication devices, a new and improved outdoor rated assembly is needed. Such mated connections are continually exposed to dust, dirt, moisture, and/or other contaminants that may infiltrate the fiber optic connectors and degrade performance or even sever the connection between components. Conventional connection assemblies, such as typical fiber optic connectors, are generally not capable of providing an adequate seal to fully prevent the ingress of unwanted fluids (for instance, water) or solid contaminants. Fiber optic network segments are particularly vulnerable because fiber optic connections require extremely precise termination and alignment between connected components and cable segments that may be disrupted by the presence of fluid or solid contaminants. As such, fiber optic network segments connected using conventional technology are very susceptible to performance and/or availability degradation over time.

Accordingly, telecommunication network providers would benefit from an outdoor rate assembly capable of maintaining a sealed and secure connection configured to prevent the ingress of unwanted materials into the outdoor rated assembly. An additional benefit is an outdoor rated adapter that can be blind-mated to an opposing outdoor rated connector. A further need is not losing components to ensure a quick reconnect, when the outdoor rated connector and adapter is disconnected. Limiting separation of parts of the connector helps prevent lost components, or unnecessary debris entering the inner area of the housing when the user is working outside during snow, wind or rain conditions.

SUMMARY OF THE INVENTION

The outdoor rated adapter or outdoor rated connector can accept a SC, LC or MPO ferrule assembly. The outdoor connector has a safety spring assembly that prevents inadvertent separation of the outdoor rated adapter and the outdoor connector when mated. When outdoor rated devices are not mated, the safety spring assembly prevents the outer housing separating from the inner housing of the outdoor rated connector. When the outdoor rated devices are mated, the non-outdoor rated fiber optic connectors housed within outdoor rated devices establish an optical signal pathway. The mating of the first fiber optic connector and the second fiber optic is guided by a roll-in guide or raised, generally spiral rib on the inner housing of the outdoor rated adapter and a key on the fiber optic holder within the outdoor rated connector.

In another embodiment, an elastic member secured within outdoor rated connector accepts a latch on an inside of the outdoor rated adapter when the outdoor devices are mated by pushing on an outer housing of the outdoor rated connector. When the outer housing of the outdoor rated connector is pulled rearward, a release protrusion on the inside of the outer housing engages a release ramp on the elastic member. This compresses at least one safety clip extending from a rim formed as part of the safety spring assembly, which moves the outdoor adapter latch out of a locking recess. The safety clip is formed as part of an arm on the elastic member to allow the unmating of the outdoor devices. When unmated, a bias pin pushes forward the outer housing of the outdoor rated connector which compresses the at least one safety clip thereby preventing an inner housing from being separated from the outer housing of the outdoor rated connector.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An adapter is a device with one or more openings configured to accept a connector. An adapter further comprises a housing, and one or more locking mechanism external or internal to the housing. An internal lock may secure a connector within an opening, and an external lock may secure adapter assembly, the latter including connectors, to a panel using a locking nut. A connector is inserted and secured at either end of adapter, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body, an external latch or recess to secure said connector into an adapter opening and one or more ferrules having optic fibers therein. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Figure 1:
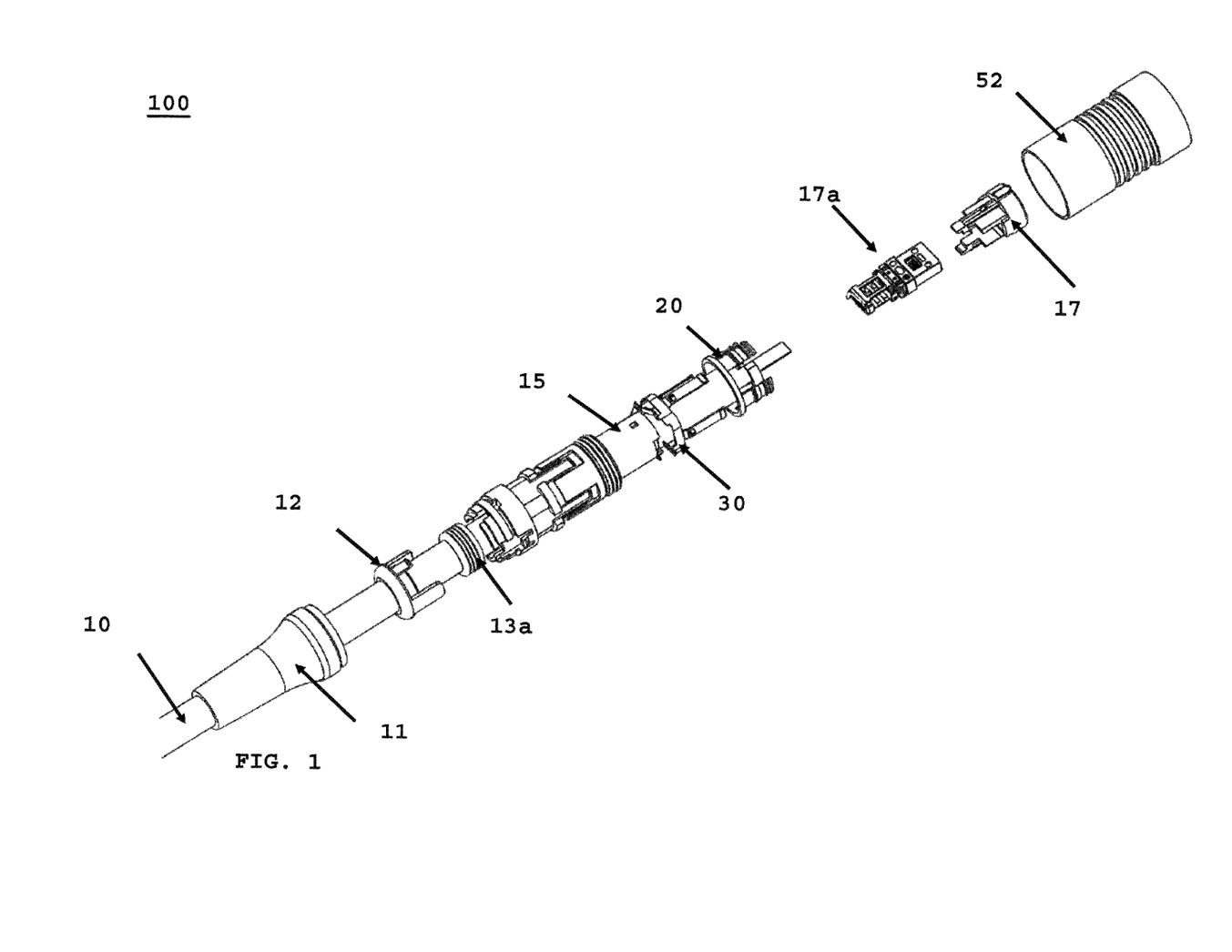
FIG. 1 is an exploded view of an outdoor rated assembly having a push/pull connector housing.

FIG. 1 depicts an exploded view of an outdoor rated assembly 100. Assembly 100 has a fiber optic cable 10 with a ribbon cable having a plurality of optical fibers therein. Boot 11 covers and protects the first end of the assembly from environmental ingress. Environment ingress or ingress is debris, rain, snow or foreign material that interferes with the optical light signal, or harms internal components such as the first or second fiber optic connectors because these devices are not rated for use outside. Boot 11 covers a first end of end cap 12. End cap 12 is secured about first seal 13a, which aids in ingress protection. (See, FIG. 9 for more detail). Inner housing 15 holds safety spring assembly 30 (see FIG. 12 for more detail) and elastic member 20 (see FIG. 11 for more detail). Second fiber optic connector 17a is secured with a second fiber optic holder 17 (see FIG. 5 for more detail), and outdoor rated connector 50 outer housing 52 is ingress protected with seal 13b (at FIG. 9). Outer housing 54 has push/pull mechanism 72 (described starting at FIG. 2).

Figure 2:
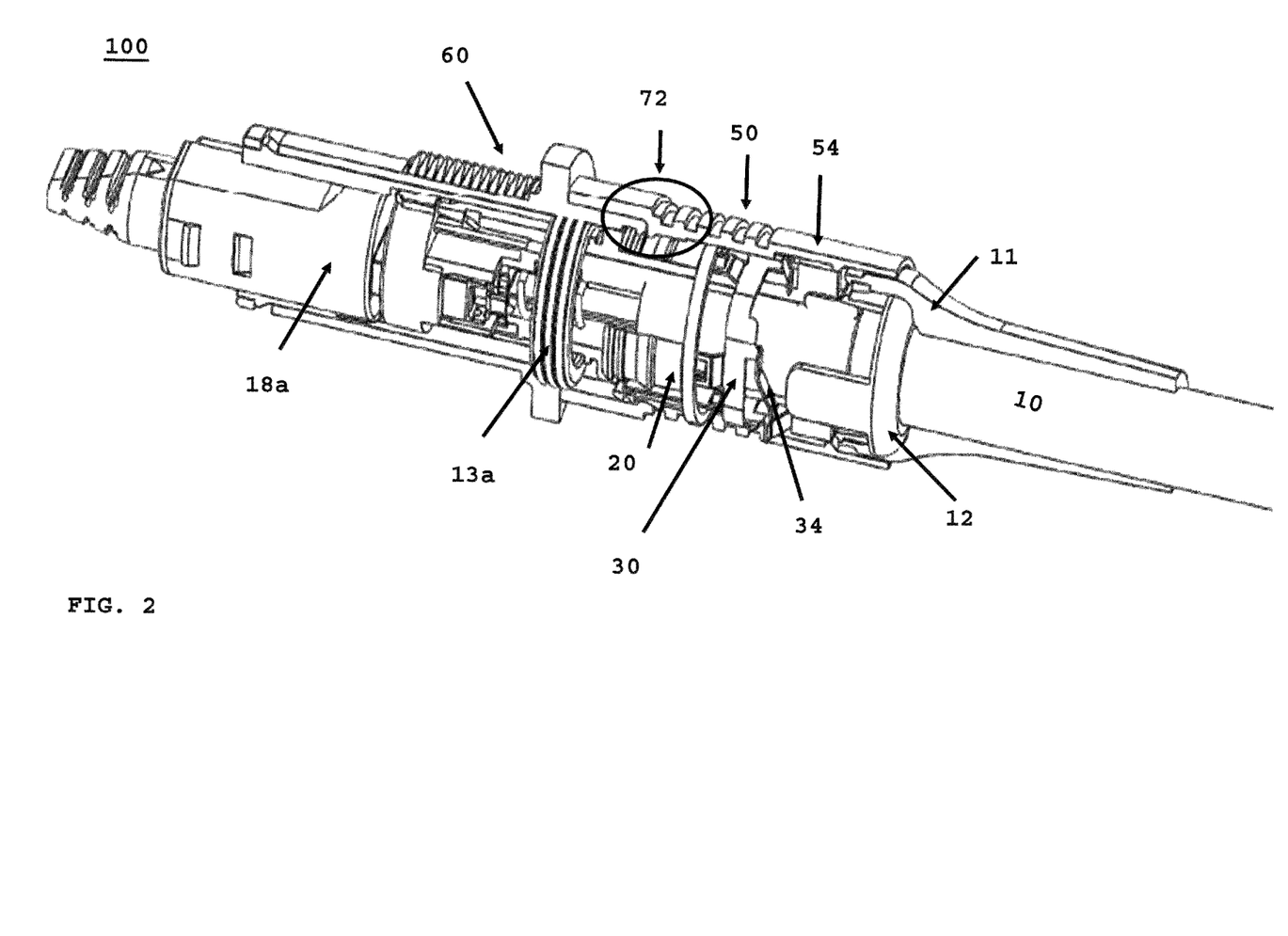
FIG. 2 is a cross-section of the assembled outdoor rated assembly.
Figure 3:
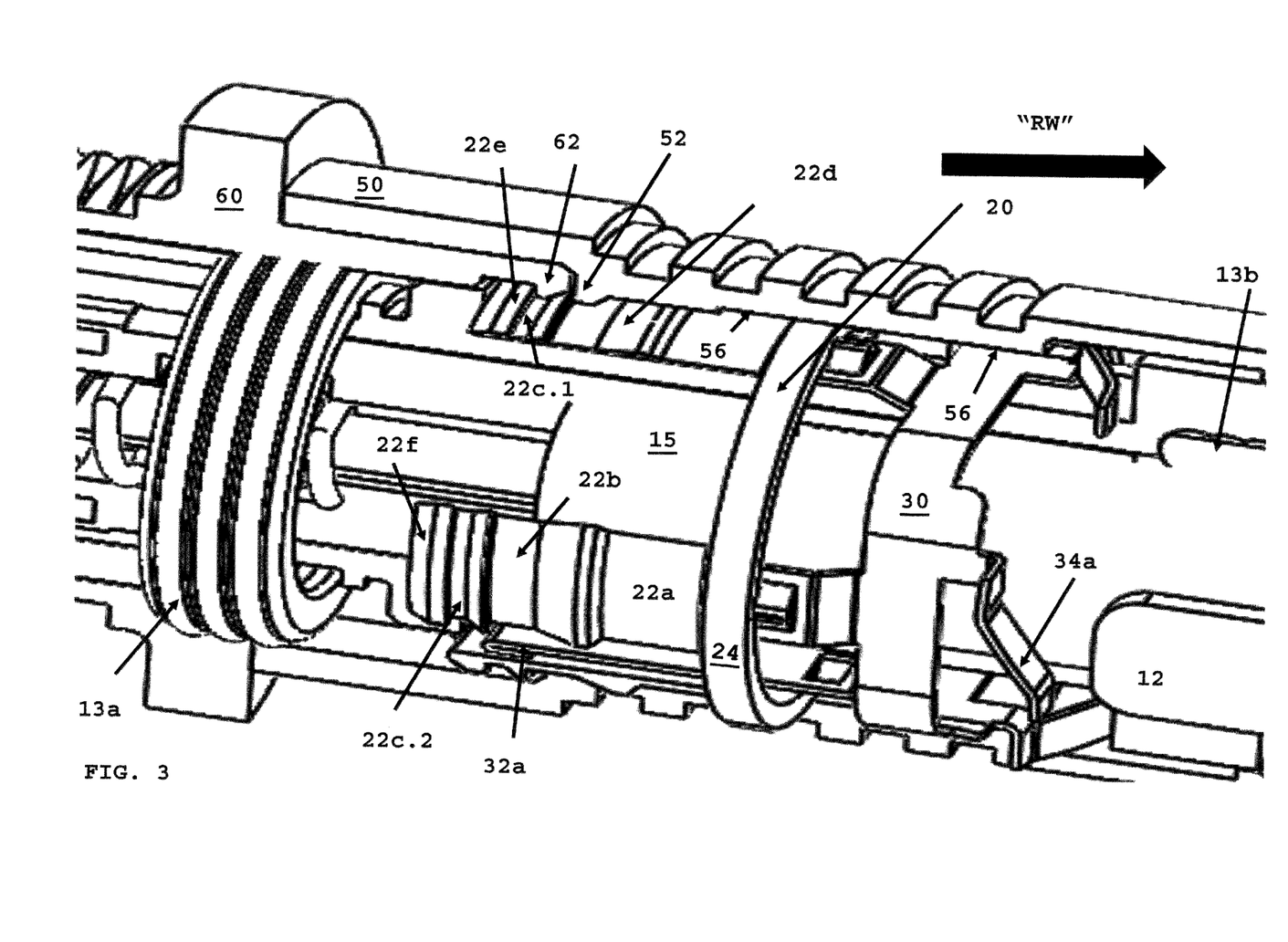
FIG. 3 is a zoomed view of a push/pull outdoor connector release mechanism in a locked condition with an outdoor rated adapter.

FIG. 2 depicts assembled outdoor rated assembly 100. Outdoor rated adapter 60 is mated with outdoor rated connector 50. Adapter 60 houses first fiber optic connector 18a. First seal 13a provides ingress protection. Referring to FIG. 3, mating occurs between adapter latch 62 with its corresponding locking recess 22c.1. Elastic member 20 (at FIG. 11) accepts and mates adapter latch 62 with safety spring assembly 30 (at FIG. 12) providing a radial bias force, "RF", over a Compressible Region to ensure assembly 100 does not come apart after the outdoor rated adapter and the outdoor rated connector are mated (at FIG. 9). During disconnect or unmating of the outdoor rated adapter and the outdoor rated connector (at FIG. 8 and FIG. 10), bias pin 34a, one of a plurality of bias pins 34(a-d) (at FIG. 12), pushes outer housing 54 forward after pulling the outer housing rearward (to a second end of assembly 100), to unmate adapter 60 and connector 50. First seal 13a provides ingress protection for adapter 60.

Figure 11:
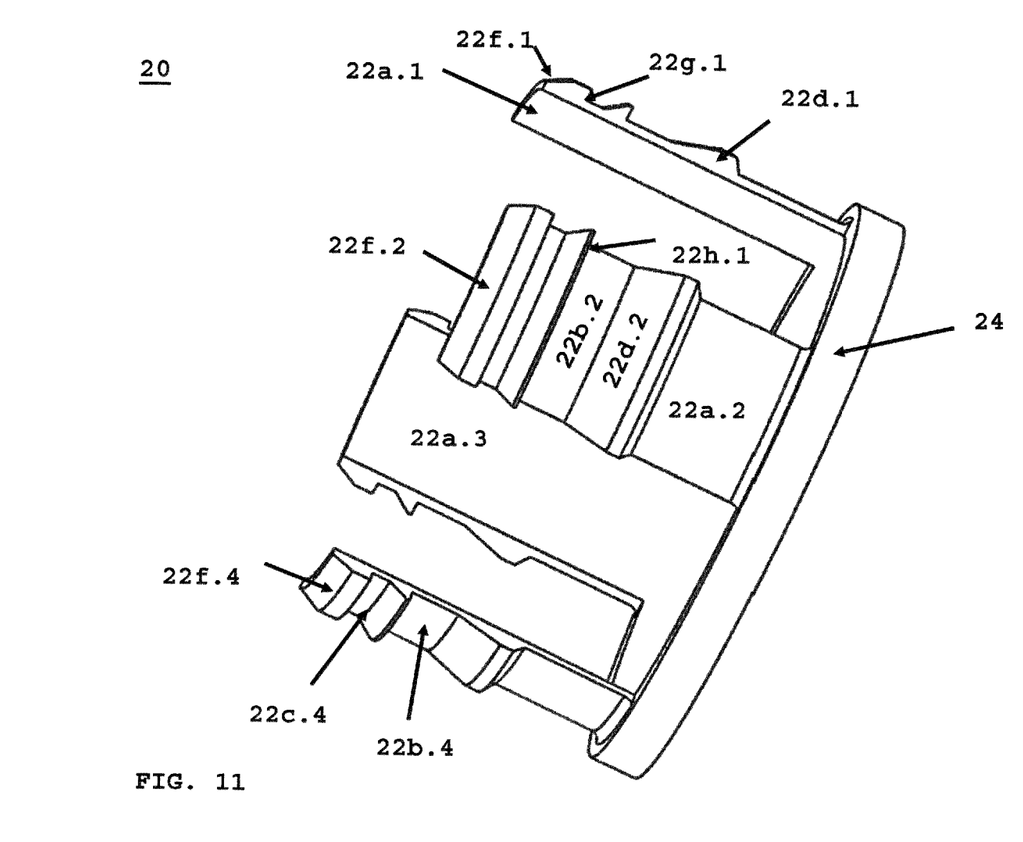
FIG. 11 is a perspective view of an elastic member.

FIG. 3 depicts a cross-section, zoomed view of outdoor rated assembly 100 near push/pull release mechanism 72 when adapter 60 and connector 50 are mated. First seal 13a is beneath a joint formed between the adapter and connector. First seal 13a aids in providing a radial force sealing the adapter 60 housing to connector outer housing 54 for additional ingress protection. When mated push/pull release protrusion 52 is secured within inner slot 22b. As described below, each extended arm 22a of elastic member 20 has inner slot 22b. Push/pull release protrusion 52 is a raised internal edge about inner surface 56 near a first end of outer housing 54. When mated, protrusion 52 abuts stop face 22h (at FIG. 9). During unmating, stop face 22h is deflected into a Compressible Region which allows protrusion 52 to move out of inner slot 22b. Referring to FIG. 11, elastic member 20 has a plurality of extended arms 22a. In this embodiment, there are four extended arms 22a, and each arm is numbered 22a.1, 22a.2, 22a.3 and 22a.4. Likewise, each inner slot 22b is numbered 22b.1, 22b.2, 22b.3 and 22b.4. It is understood when describing inner slot 22b the function and structure applies to each inner slot (22b.1-22b.4), and the same is true for other elements that have a plurality of elements formed as part of an assembly or sub-component.

Figure 7:
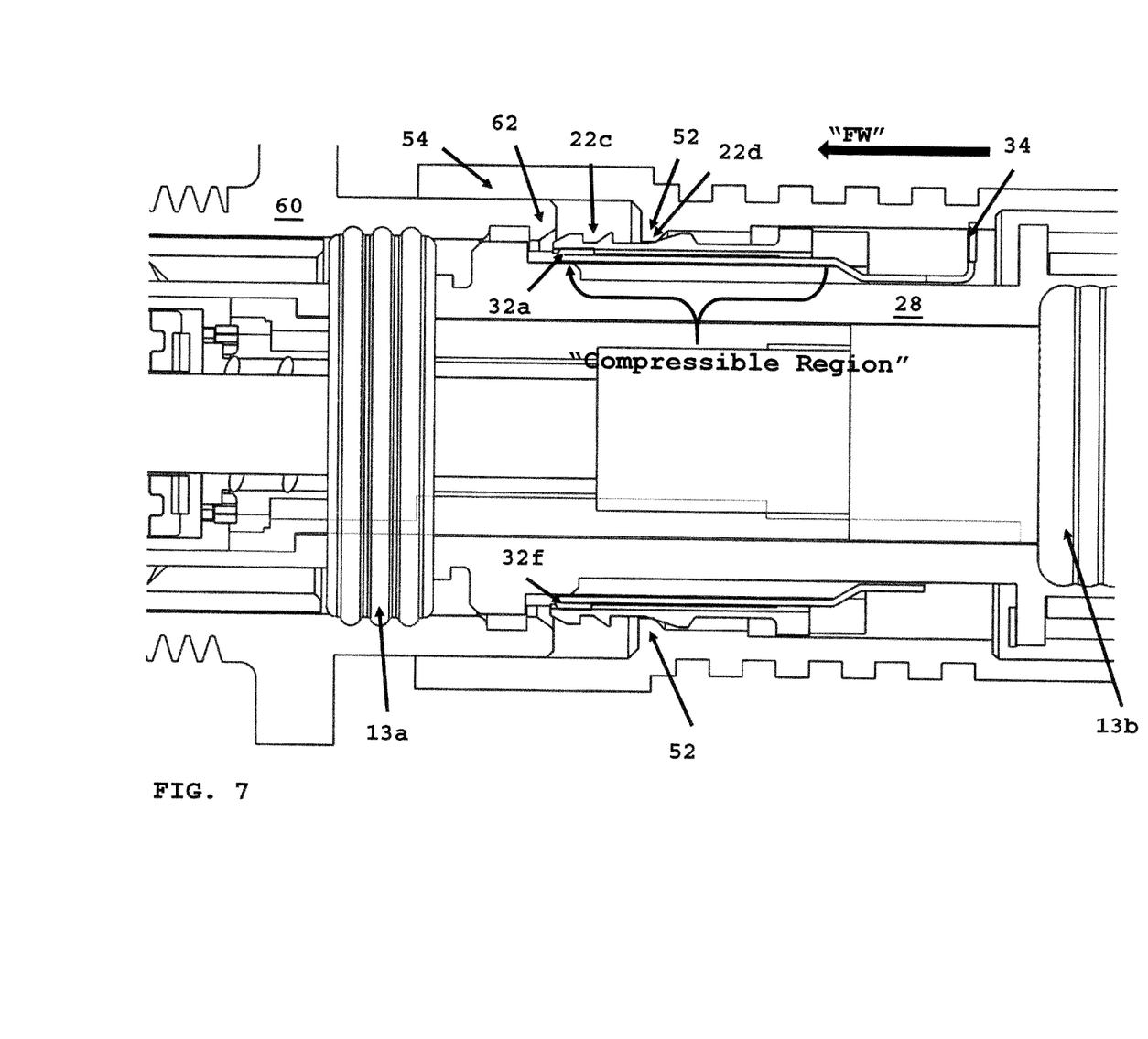
FIG. 7 is a partial cross-section before the outdoor rated adapter mates with the outdoor rated connector by pushing on connector outer housing.
Figure 9:
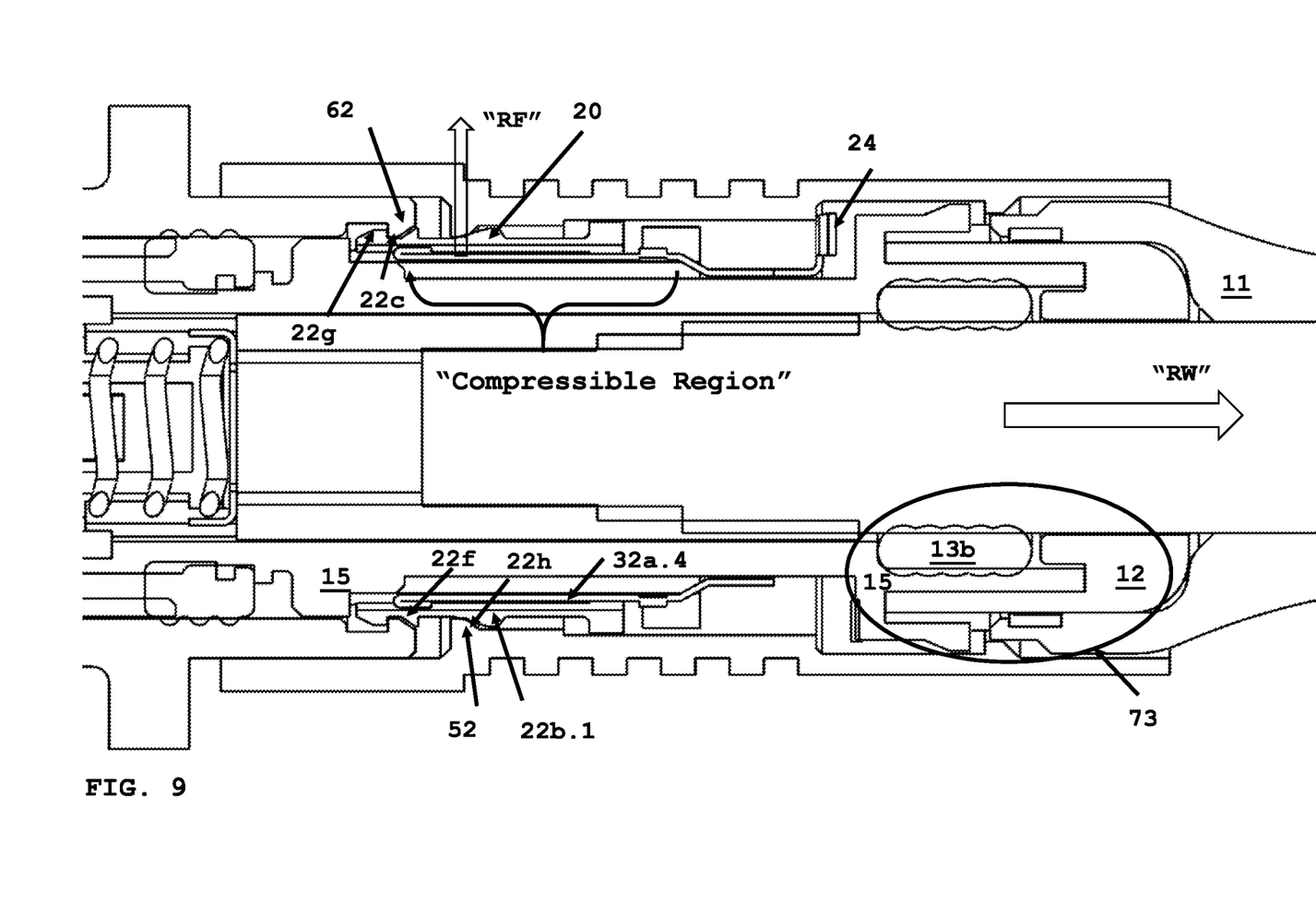
FIG. 9 is a partial cross-section when the outdoor rated adapter and the outdoor rated connector are mated.
Figure 10:
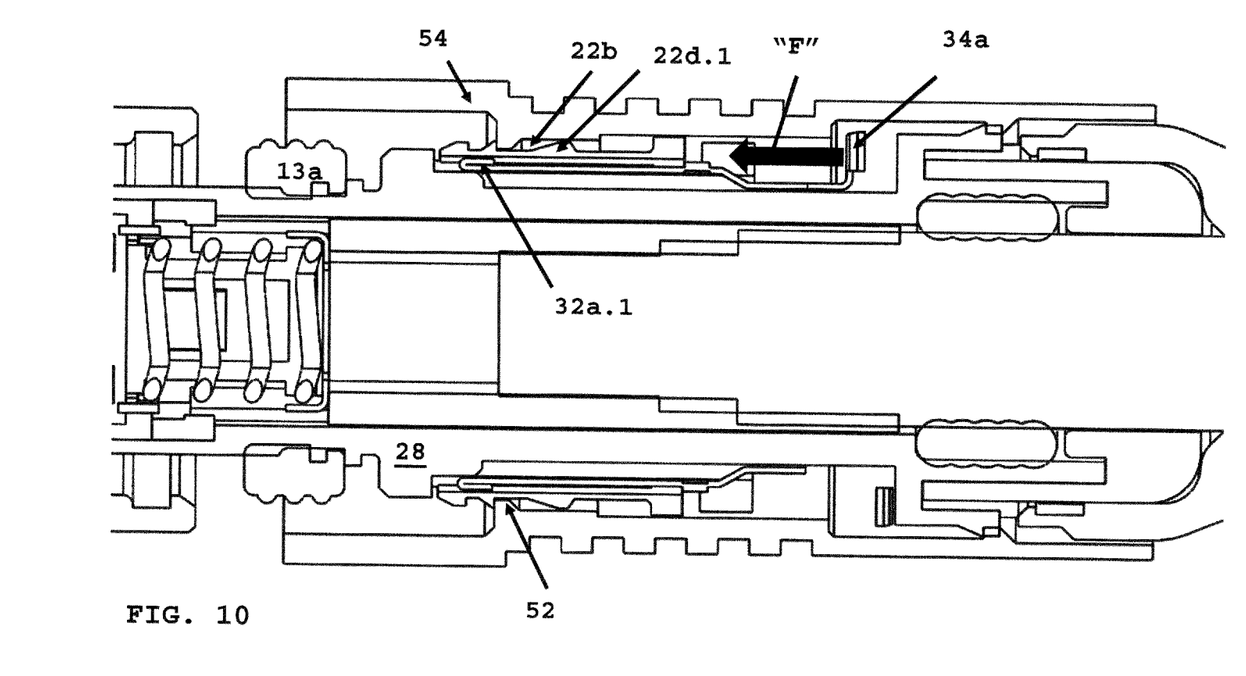
FIG. 10 is a partial cross-section when the outdoor rated adapter is separated from the outdoor rated connector.

Still referring to FIG. 3, pulling outer housing 54 rearward at arrow "RW", ramp recess 22d lifts push/pull release protrusion 52 out of inner slot 22b. This also biases downward elastic member 20 extended arms 22a, (at FIG. 8 arrow "D"). This allows adapter latch 62 to move out of locking recesses 22c, as outer housing 52 is still pulled rearward until assembly 100 unmates as shown in FIG. 7. When bias pin 34 relaxes, the outer housing 54 is returned to a forward position with inner slots 22b as shown at FIG. 10. Locking tab 22e and its stop face 22f holds adapter 62 within locking recess 22c. Stop face 22f is chamfered or sloped to allow adapter latch 62 to lift out of locking recess 22c, when released using outer housing 54, without binding thereby reducing debris. When mated, safety clip 32a provides radial bias force "RF" in the Compressible Region, as shown in FIG. 9. Each extended arm (22a.1-22a.4) is biased outward by a safety clip.

Figure 4:
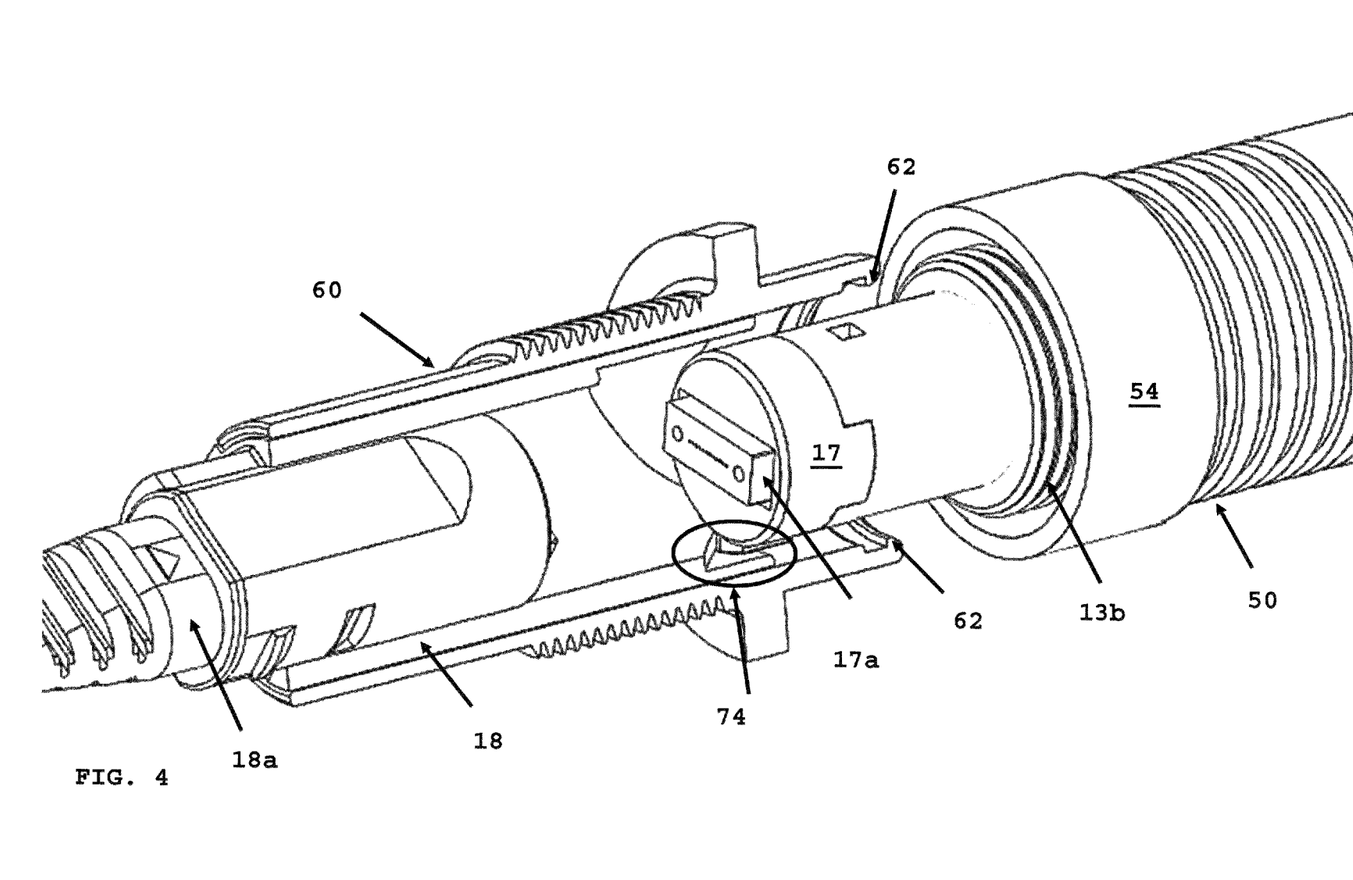
FIG. 4 is a cut-away view of inserting a first fiber optic connector to mate with a second fiber optic connector.

FIG. 4 depicts outdoor rated adapter 60 and outdoor rated connector 50 prior to mating. First fiber optic connector 17a is held in first holder 17 (at FIG. 5) and second fiber optic connector 18a is held in second holder 18 (at FIG. 5). FIG. 4 shows circumferential adapter latch 62 at a second end of outdoor rated adapter 60. FIG. 4 identifies roll-in mechanism 74 for blind mating of the first fiber optic connector and the second fiber optic connector. The first and second fiber optic connectors are not outdoor rated or ingress protected, which is why the present invention, outdoor assembly 100, is ingress protected with first seal 13a (at FIG. 3) and second seal 13b.

Figures 5, 6:
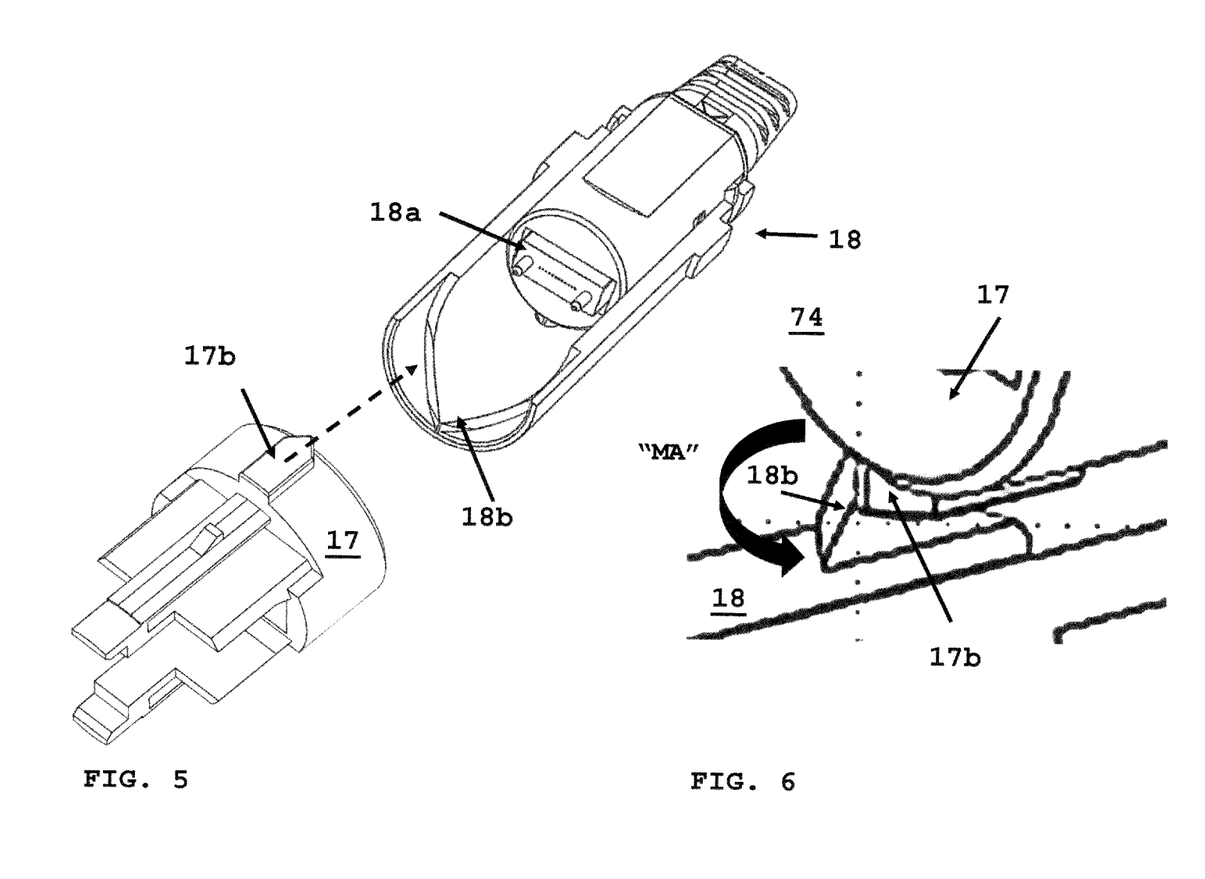
FIG. 5 is an exploded view of the first fiber optic connector holder with orientation key prior to connection to the second fiber optic connector with an orientation rib.
FIG. 6 is a zoomed view of orientation key and orientation rib detailing a blind mate mechanism.

FIG. 5 depicts first fiber optic holder 17 configured to first fiber optic connector 17a, at a first end of holder 17. The second end of holder 17 has orientation key 17b. As shown in dotted lines, key 17b engages orientation rib 18b and operates at FIG. 6, to provide blind mating of the two fiber optic connectors. Referring to FIG. 6, orientation key 17b moves along, as indicated by arrow "MA", orientation rib 18b to align and position the opposing first and second fiber optic connectors (17a, 18a) perpendicular to each other so when outer housing 54 is pushed forward to mate the adapter 60 and connector 50, the opposing connectors are fully mated without binding or twisting.

FIG. 7 depicts outdoor rated adapter 60 prior to pushing outer housing 54 forward, in direction of arrow "FW", to receive adapter latch 62 within locking recess recesses 22c of the plurality of extended arms 22a. Adapter latch 62 engages outer chamfered surface 22g (at FIG. 9) of extended arm 22a, to allow the adapter latch to push down the extended arm. This pushes extended arm down at arrow "D", (at FIG. 8), so adapter latch 62 can be received in locking recesses (22c.1-22c.4) and secured behind stop face 22f (at FIG. 8). Safety clip 32a is biased into the "Compressible Region".

Figure 8:
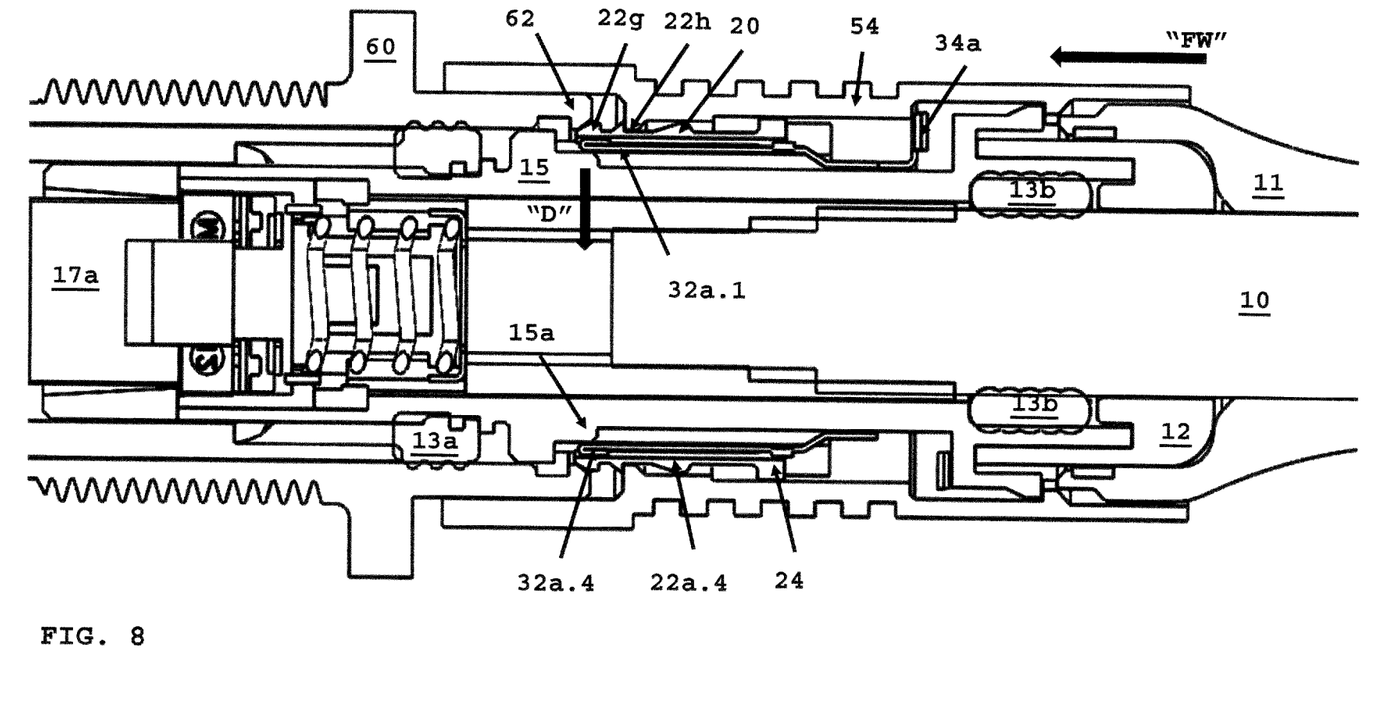
FIG. 8 is a partial cross-section just before the outdoor rated adapter mates with the outdoor rated connector by pushing on a connector outer housing.

FIG. 8 depicts outer housing 54 pushing forward in direction "FW". The adapter latch 62 engages stop face 22h and, because elastic member 20 is secured by support ring 34 (at FIG. 11) to inner housing 15 and safety clip 32a, is compressed between shelf 15a and extended arm 22a. The outdoor rated connector 50 moves forward until adapter latch 62 is received in locking recesses 22c.

FIG. 9 depicts outdoor rated assembly 100 assembled, which is outdoor rated adapter 60 mated to outdoor rated connector 50 with the first and second fiber optic connectors establishing an optical communication path. When mated, safety clip 32 provides radial force "RF" securing adapter 60 and connector 50 together preventing inadvertent unmating unless a user pulls on outer housing 54 with a pulling force sufficient to overcome the sum of the radial spring forces, "RF", of the plurality of safety clips (32a.1-32a.4). In the present invention, the total "RF" is determined by the individual spring force "K" of each safety clip 32a and the number of safety clips deployed in safety spring assembly 30 (at FIG. 12).

FIG. 9 further discloses ingress protection, "IP", indicated at 73. The ingress protection "IP" 73 for outdoor rated connector 50 has boot 11 molded over end cap that accepts inner housing 15 which compresses second seal 13b. Boot 11 is latched to inner housing 15. To release connector 50 from adapter 60, outer housing 54 is pulled in direction of arrow "RW". Bias pin 24 moves in direction "RW". Push/pull release 52 engages the chamfered edge of stop face 22h of ramp release 22b.1 (at FIG. 10) and pushes down "D" safety clip 32a.4 into the "Compressible Region" which pushes or pops adapter latch 62 out of locking recess 22c. This release operation is the same for adapter latch 62, which is circumferentially (at FIG. 4, for safety clips (32a.1-32a.4), locking recesses (22c1.-22c4), and ramp releases (22d.1-22.4)).

FIG. 10 depicts bias pin 34 pushing forward (in direction of arrow "F") outer housing 54, after adapter 60 and connector 50 are unmated. Push/pull release protrusion 52 is stopped at stop face 22h (at FIG. 9), and bias pins 34 release their compressive force.

FIG. 11 depicts elastic member 20. Elastic member 20 has a plurality of extended arms (22a.1-22a.4). In the present invention there are four arms but there can be more or less depending on the total force needed to secure the outdoor rated adapter 60 and outdoor rated connector 50 together to form outdoor rated assembly 100. Each arm 22a has locking recess 22c to secure circumferential adapter latch 62, inner slot 22b to retain push/pull release protrusion 52 and ramp release 22d. The arms (22a.1-22a.4) are terminated at support ring 24, which is configured to secure about inner housing 15 within connector 50.

Figure 12:
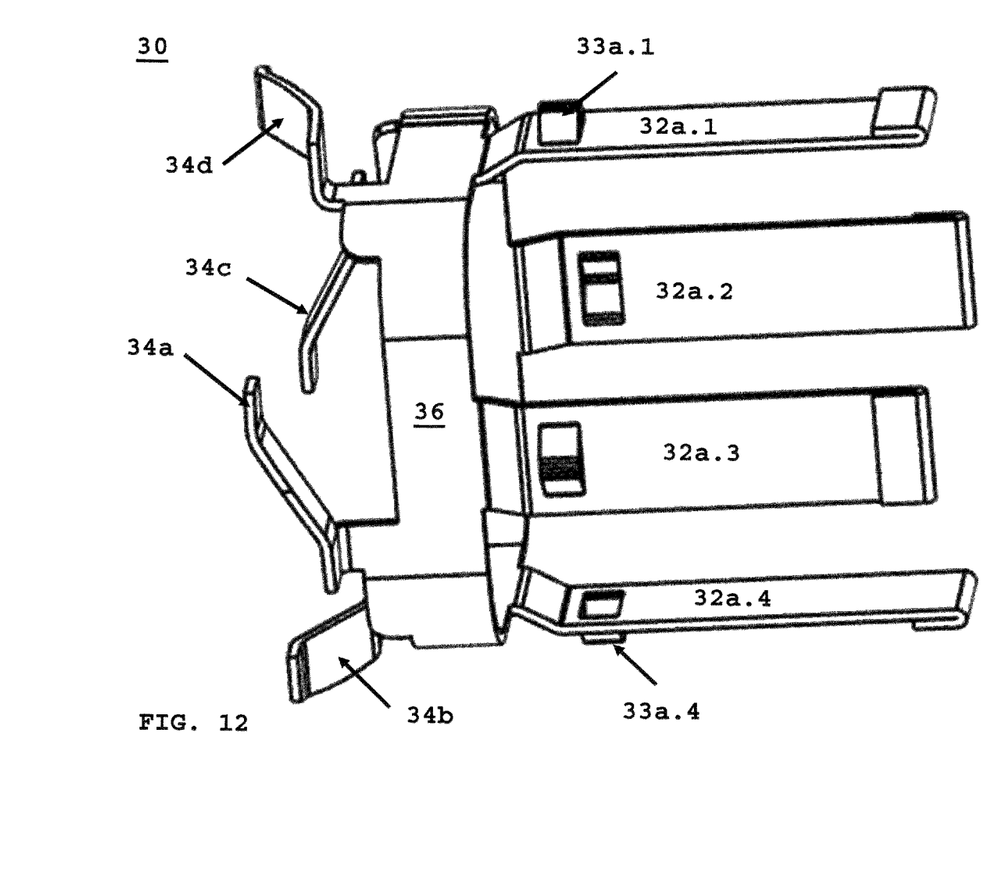
FIG. 12 is a perspective view of a safety spring assembly.

FIG. 12 depicts safety spring assembly 30. Assembly 30 is secured to inner housing 15 (at FIG. 1) by main body 36. At a first end of main body 36 is a plurality of bias pins (34a-34d), and at a second end of main body 36 is a plurality of safety clips (32a.1-32a.4). Each safety clip has a locking tab (33a.1-33a.4) that engages inner surface 56 to ensure safety spring assembly 30 does not bind during push/pull release of connector 50 outer housing 54.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. An outdoor rated fiber optic assembly, comprising:
    an outdoor rated connector having a first fiber optic connector secured therein;
    an outdoor rated adapter having a second fiber optic connector secured therein;
    the outdoor rated adapter has a latch circumferential about an inner surface of the adapter;
    the outdoor rated connector has a plural of locking recesses equally spaced apart circumferential within the outdoor rated connector, the locking recesses are configured to receive the latch at any position along the latch; and
    a safety spring assembly exerts a radial force on the plural of locking recesses and the latch position received within the locking recess securing the outdoor rated adapter to the outdoor rated connector.

2. The outdoor rated fiber optic assembly of claim 1, wherein the outdoor rated connector further comprises an outer housing and an inner housing, and further wherein the safety spring assembly has at least one bias pin configured to reposition forward the outer housing to substantially cover the inner housing when the outdoor rated connector is unmated from the outdoor rated adapter.

3. The outdoor rated fiber optic assembly of claim 2, wherein the safety spring assembly has a plural of safety clip when compressed binds the outdoor rated connector to the outdoor rated adapter.

4. The outdoor rated fiber optic assembly of claim 1, wherein the first fiber optic connector has a male configuration and the second fiber optic has a female configuration when mated forming an optical communication path.

5. The outdoor rated fiber optic assembly of claim 4, wherein the first fiber optic connector and the second fiber optic connector further comprise a mechanical transfer ferrule with at least one optical fiber.

6. The outdoor rated fiber optic assembly according to claim 1, wherein the outdoor rated connector further comprises a seal; and wherein an end cap secures a fiber optic cable at a distal end and forms an environmental seal at a proximal end with the seal.

* * * * *